June 16, 1931.　　　J. F. MAKOWSKI　　　1,810,142

CONDUIT COUPLING COLLAR

Filed July 20, 1929

INVENTOR

J. F. Makowski

BY

ATTORNEY

Patented June 16, 1931

1,810,142

UNITED STATES PATENT OFFICE

JOHN F. MAKOWSKI, OF OAKLAND, CALIFORNIA, ASSIGNOR TO FIREPROOF WALL COMPANY, OF RENO, NEVADA, A CORPORATION OF NEVADA

CONDUIT COUPLING COLLAR

Application filed July 20, 1929. Serial No. 379,812.

This invention relates to an underground conduit structure, as for instance cable conduit, sewer pipe, water pipe, etc. A particular example of a structure of that kind as applied to cable conduit is shown in my co-pending application for patent Serial No. 355,141, filed April 15th, 1929, since matured into Patent No. 1,783,178, dated Dec. 2, 1930, in which each conduit consists of a number of separate but longitudinally alined tubular or cylindrical sections, and the method of arranging and nesting a plurality of such sections in connection with the coupling which is the subject matter of this application is particularly shown in my co-pending application for patent, Serial No. 379,813 filed July 20, 1929.

In laying conduits of this general character in the trench it is usually desirable to lay several of the same in side by side and also in superimposed relation, and the conduit assembly is then covered with concrete, sand or cinders for the purpose of embedding and holding the nested construction in close relationship.

The present practice of laying the conduit is to first lay one course thereof and then pour concrete over the same; then this process is repeated for succeeding courses until the total structure is completed. Heretofore it has been a somewhat difficult task to so set the conduits to prevent them from rolling or floating as the concrete is flowed in around the same and it has been necessary to build wooden brackets or cradles about the conduits as they were laid in order to maintain them in proper position, which latter method requires considerable time, labor and expense to carry out and is not always entirely successful.

The principal object of my invention therefore is to provide collars which are not only adapted to couple the adjacent ends of the individual conduit sections together but which automatically form cradles for supporting the other conduits thereon in non-rolling relation as well as providing a stable support from the bed of the trench for the lowermost row of conduits.

It also frequently happens that such conduits must be deflected from a straight line to pass about some obstruction such as a sewer pipe or the like; and a further object of the invention is to construct the coupling collars so that the straight line of the conduit may be thus deviated from without the necessity of using any specially formed conduits or collars.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 2:
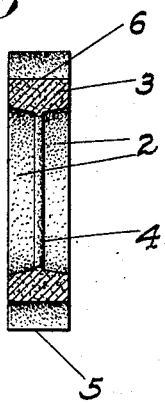
Fig. 2 is a cross section of a collar.

Referring now more particularly to the characters of reference on the drawings, the numeral 1 denotes a conduit-section—a cylindrical element of certain length. The ends of adjacent sections are adapted to fit freely in the central opening 2 provided in the coupling collar 3 which is of concrete or like material. This opening centrally between its ends has an inwardly projecting bead 4 which limits the inward movement of the sections; and the opening flares or diverges outwardly from each side of the bead to its outer end as clearly shown in Figs. 2 and 3.

The periphery of the collar is not circular but is formed with a number of evenly spaced lugs or projections 5 between which the surface of the collar is depressed as at 6 on a curve the same as the exterior curvature of the conduit so as to provide a number of cradles which form supports and side engaging means for adjacent conduits.

The adjacent ones of the spaced lugs 5 form ground bearing elements so as to support the lowermost conduit from the bottom of the trench in fixed and non-rolling position. The depressed or cradle feature enables the superimposed conduit to be supported in definitely spaced and non-rolling relation to the conduit below. Also since the cradles on the sides of the collar also engage and partially embrace the sides of the adjacent conduits as well, any conduit along side another is prevented from vertical displacement relative thereto. The advantage of this feature is of special value in connection with the method of assembling the conduit structure, as set forth in said last co-pending application for patent.

Figure 1:
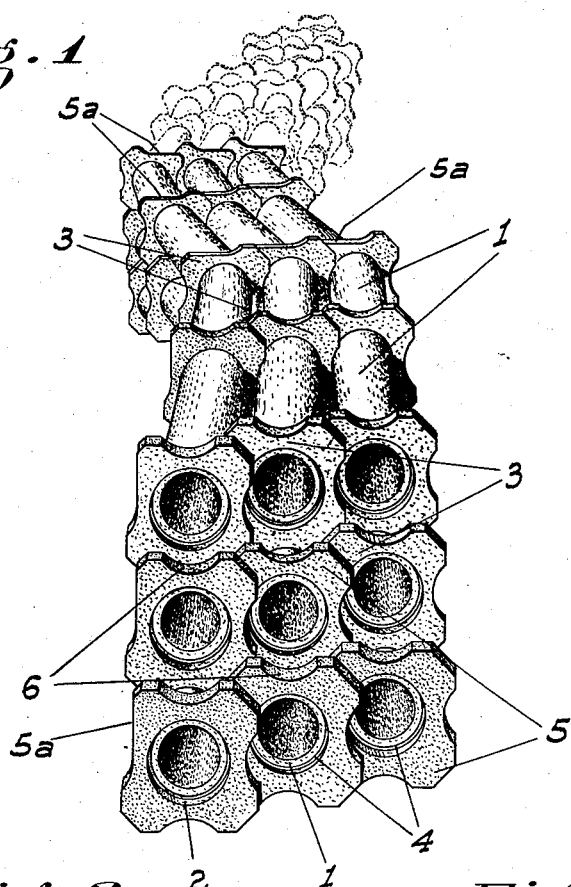
Fig. 1 is a perspective view of a plurality of conduits arranged in connection with the coupling collars.
Figure 3:
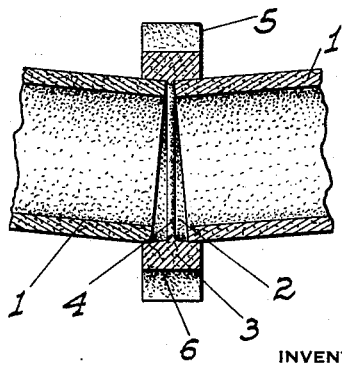
Fig. 3 is a fragmentary section of a collar and adjacent conduit sections arranged in angular relation to each other.

The flaring form of the collar opening as above set forth enables adjacent conduit sections to be disposed at a certain angle to each other and to the collar as shown in Fig. 3. This is done without the use of any special collars or conduits and allows the line of the conduit as a whole to be diverted laterally as shown in Fig. 1 or vertically as the case may be if it is necessary to avoid an obstruction in the direct line of the conduit.

When it becomes necessary to bend the conduit from a straight line either vertically or horizontally, if each side of each collar had uniform lugs 5 and depressions 6, the assembled staggered collars and conduit would naturally be forced out of compact nested form. Thus the mutual support between the collars and the adjacent conduit sections would be lost and a considerable leverage built up against the unsupported collars which would result in the serious breakage of the collars both from the weight of the assembled conduit or from the weight of an operator walking over the top of the assembly, as is sometimes necessary. Provision must therefore be made in the construction of the collars to compensate for the unequal stresses which would be thus placed upon them. To provide for this compensation and allow the collars to be maintained in their mutual compact form relative to the conduits even when the conduits are bent from a straight line, I construct the collars so that one side of one of the lugs 5 of such collar is cut off at a tangent to the bottom of an adjacent depression 6 as shown at 5a. Thus when the conduit is assembled so as to be bent out of a straight line, as to the left, these open sided lugs are placed at the upper left hand side of the collars as they stand in supporting position. This then permits of a shifting of the superimposed members laterally while at the same time maintaining a firm support for the same and without building up any improper stress or leverage against the collars. When the bend is to the right these open sided lugs are placed to the right, or if the bend is to be up or down they are placed up or down accordingly so as to provide at all times a firm support of the conduit but preventing the building up of any undue stresses or leverage against the collars. When no bends are necessary but the conduit is laid in a straight line then the collars are so set that the open sided lugs are placed to be in a neutral position whereby the structure assembly is fully reinforced at all times and its compactness and strength retained.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A conduit support comprising a collar having an orifice to receive one end of a conduit therein; the exterior periphery of the collar being shaped to engage the ground in non-tipping relationship, and also to form a cradle for an adjacent conduit.

2. A conduit support comprising a collar having an orifice to receive one end of a conduit therein; the exterior periphery of the collar being formed with a plurality of spaced projections, an adjacent pair of which are adapted to engage the ground simultaneously.

3. A conduit support comprising a collar having an orifice to receive one end of a conduit therein; the exterior periphery of the collar being formed with a plurality of spaced recesses each shaped to conform to the exterior periphery of a conduit.

4. A conduit support comprising a collar having an orifice to receive one end of a conduit therein; the exterior periphery of the collar being formed with a plurality of spaced projections, an adjacent pair of which are adapted to engage the ground simultaneously, and with recesses between said projections each shaped to conform to the exterior periphery of a conduit.

5. A conduit support comprising a collar having an orifice, the exterior periphery of the collar on three sides having a pair of spaced projecting lugs forming an intermediate depression and the fourth side having but one of said lugs.

In testimony whereof I affix my signature.

JOHN F. MAKOWSKI.